(12) United States Patent
Suzuki et al.

(10) Patent No.: US 11,869,034 B2
(45) Date of Patent: Jan. 9, 2024

(54) OPTIMIZATION DEVICE, OPTIMIZATION METHOD, AND RECORDING MEDIUM

(71) Applicant: NEC Corporation, Tokyo (JP)

(72) Inventors: Yasuhisa Suzuki, Tokyo (JP); Werner Wee, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/778,493

(22) PCT Filed: Nov. 26, 2019

(86) PCT No.: PCT/JP2019/046092
§ 371 (c)(1),
(2) Date: May 20, 2022

(87) PCT Pub. No.: WO2021/106060
PCT Pub. Date: Jun. 3, 2021

(65) Prior Publication Data
US 2022/0414707 A1    Dec. 29, 2022

(51) Int. Cl.
*G06Q 30/00* (2023.01)
*G06Q 30/0242* (2023.01)
*G06Q 30/0251* (2023.01)

(52) U.S. Cl.
CPC ..... *G06Q 30/0244* (2013.01); *G06Q 30/0264* (2013.01)

(58) Field of Classification Search
None
See application file for complete search history.

(56) References Cited

U.S. PATENT DOCUMENTS

| | | | |
|---|---|---|---|
| 2008/0235274 A1 | 9/2008 | Iwasaki et al. | |
| 2011/0055127 A1 | 3/2011 | Umblijs | |
| 2018/0114154 A1* | 4/2018 | Bae | G06Q 10/067 |
| 2019/0391807 A1* | 12/2019 | Inagaki | G06N 10/00 |

FOREIGN PATENT DOCUMENTS

| | | |
|---|---|---|
| JP | 2000-293501 A | 10/2000 |
| JP | 2002-084240 A | 3/2002 |
| JP | 2002-344933 A | 11/2002 |
| JP | 2009-181195 A | 8/2009 |
| JP | 2011-065636 A | 3/2011 |
| JP | 2019-200695 A | 11/2019 |
| WO | 2005/096629 A1 | 10/2005 |

OTHER PUBLICATIONS

International Search Report for PCT Application No. PCT/JP2019/046092, dated Jan. 21, 2020.
JP Office Action for JP Application No. 2021-560790, dated Sep. 5, 2023 with English Translation.
Eto et al., "an intention learning technique to imitate the decision by the researcher", vol. 72, No. 1, pp. 95-98, Oct. 31, 2019, NEC Corporation, Japan.

* cited by examiner

*Primary Examiner* — Alvin L Brown
(74) *Attorney, Agent, or Firm* — Sughrue Mion, PLLC

(57) ABSTRACT

A change in a weighting coefficient for an explanatory variable in an objective function used to optimize a target is received, and the target is optimized based on the objective function to which the changed weighting coefficient has been applied.

8 Claims, 6 Drawing Sheets

OPTIMIZATION DEVICE, OPTIMIZATION METHOD, AND RECORDING MEDIUM

This application is a National Stage Entry of PCT/JP2019/046092 filed on Nov. 26, 2019, the contents of all of which are incorporated herein by reference, in their entirety.

TECHNICAL FIELD

The present invention relates to an optimization device, an optimization method, and a recording medium.

BACKGROUND ART

Considerable labor is used to schedule scheduling targets based on the characteristics thereof. For example, the work for deciding on the dates and times at which advertisements are to be broadcast takes considerable labor from workers.

As related technology, Patent Document 1 discloses technology for preparing a television program schedule defining a temporal sequence of multiple contents distributed to a user in accordance with the user's preferences and circumstances.

CITATION LIST

Patent Literature

Patent Document 1
WO 2005/096629 A1

SUMMARY OF THE INVENTION

Problem to be Solved by the Invention

A system that can easily perform the scheduling intended by a user when performing scheduling work for scheduling targets is sought.

Therefore, an example of an objective of the present invention is to provide an optimization device, an optimization method, and a recording medium that solve the above-mentioned problem.

Means for Solving the Problem

An optimization device according to an aspect of the present invention is characterized by being provided with a reception means for receiving a change in a weighting coefficient for an explanatory variable in an objective function used to optimize a target, and an optimization means for optimizing the target based on the objective function to which the changed weighting coefficient has been applied.

Additionally, an optimization method according to an aspect of the present invention is characterized by receiving a change in a weighting coefficient for an explanatory variable in an objective function used to optimize a target, and optimizing the target based on the objective function to which the changed weighting coefficient has been applied.

Additionally, a recording medium according to an aspect of the present invention is characterized by recording a program for making a computer function as a reception means for receiving a change in a weighting coefficient for an explanatory variable in an objective function used to optimize a target, and an optimization means for optimizing the target based on the objective function to which the changed weighting coefficient has been applied.

Advantageous Effects of Invention

According to the present invention, a change in a weighting coefficient for an explanatory variable in an objective function used to optimize a target is received from a user, and the target is optimized based on the objective function to which the changed weighting coefficient has been applied. As a result thereof, when performing work to optimize a target, optimization can be performed by means of an objective function computed in accordance with a weighting coefficient for an explanatory variable as intended by a user.

EXAMPLE EMBODIMENT

Hereinafter, a scheduling device according to one embodiment of the present invention will be explained with reference to the drawings.

Figure 1:
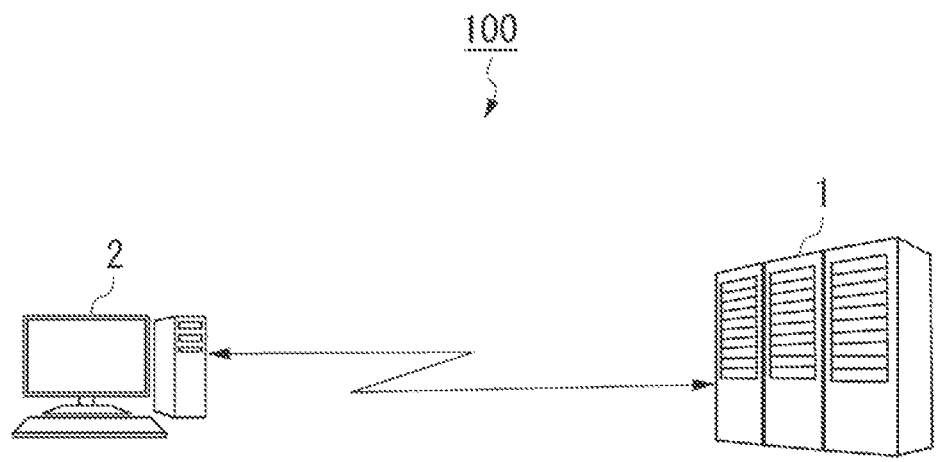
FIG. 1 is a diagram illustrating an overview of a scheduling system.

FIG. 1 is a diagram illustrating an overview of a scheduling system comprising the scheduling device according to the same embodiment.

The scheduling system 100 illustrated in FIG. 1 is one example of an optimization system. The scheduling system 100 is configured by communicably connecting a scheduling device 1, which is one example of an optimization device, with a terminal 2. The terminal 2 outputs input information from a worker to the scheduling device 1. The scheduling device 1, based on the input information indicating the instructions from the worker, automatically generates schedule data for a scheduling target similar to that of a worker who is an expert in scheduling work. In the present embodiment, the scheduling device 1 automatically generates schedule data defining broadcasting times for advertisement broadcasts that are scheduling targets, which are an example of optimization targets.

Figure 2:
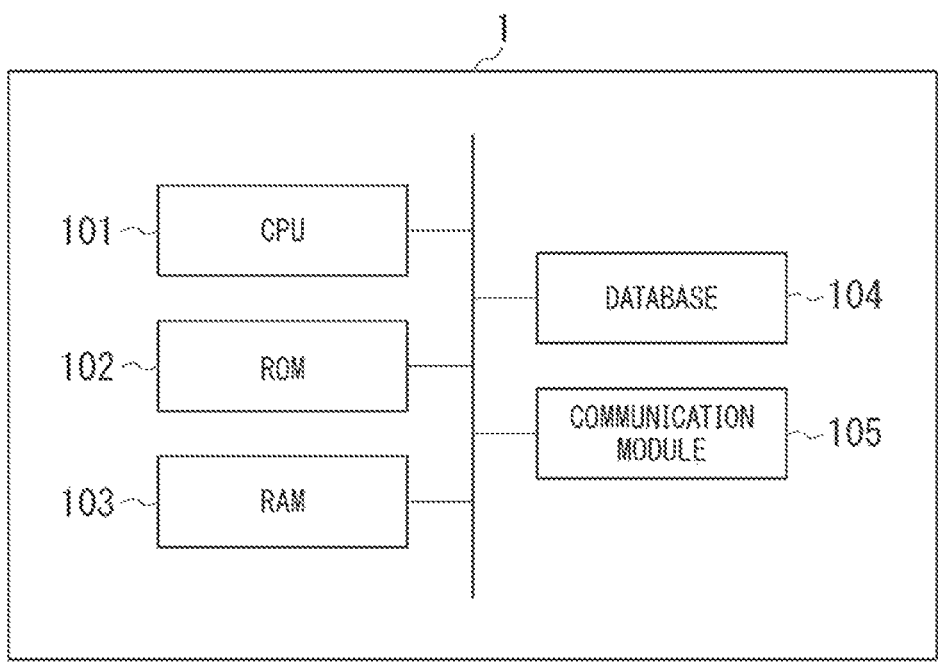
FIG. 2 is a diagram illustrating the hardware configuration of a scheduling device.

FIG. 2 is a diagram illustrating the hardware configuration of the scheduling device 1.

As illustrated in this diagram, the scheduling device 1 is a computer comprising various types of hardware such as a CPU (Central Processing Unit) 101, a ROM (Read-Only Memory) 102, a RAM (Random Access Memory) 103, a database 104, and a communication module 105. The terminal 2 is also a computer comprising similar hardware.

Figure 3:
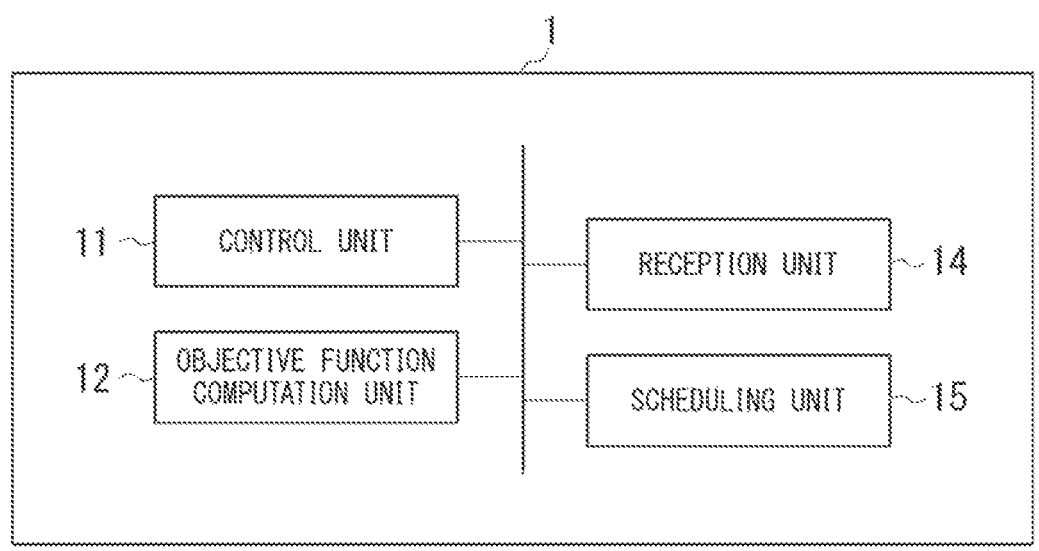
FIG. 3 is a functional block diagram of the scheduling device.

FIG. 3 is a functional block diagram of the scheduling device.

A CPU 101 in the scheduling device 1 is started when the power is switched on, and executes a pre-stored scheduling program. As a result thereof, the scheduling device 1 activates the functions of the control unit 11, the objective function computation unit 12, the reception unit 14, and the scheduling unit 15.

The control unit 11 controls the other functions of the scheduling device 1.

The objective function computation unit 12 uses optimized results by an expert who has performed the optimization in the past, a constraint parameter relating to an explanatory variable, a changed weighting coefficient for the explanatory variable, and an inverse optimization technique to compute an objective function J(x) used for optimizing the optimization target. In the present embodiment, the objective function computation unit 12 computes the objective function J(x) and the constraint condition to be used for generating schedule data that is the scheduling target.

The reception unit 14 receives changes to the information such as a weighting coefficient for the explanatory variable in the objective function.

The scheduling unit 15 optimizes the target based on the objective function J(x) to which the changed weighting coefficient has been applied, thereby generating the schedule data that is the scheduling target.

In the present embodiment, the scheduling target is an advertisement broadcast, and the schedule data indicates a schedule for television program broadcasts and advertisement broadcasts. In such a case, the objective function computation unit 12 may compute an objective function J(x) for each advertisement broadcast. Additionally, the objective function computation unit 12 may compute an objective function J(x) and a constraint condition for respective groups determined based on the characteristics of the advertisement broadcast. Additionally, the scheduling unit 15 specifies a group based on the characteristics of a new advertisement broadcast, and uses the objective function J(x) and the constraint condition computed for that group to generate schedule data for the advertisement broadcast having an undecided schedule.

First Embodiment

Figure 4:
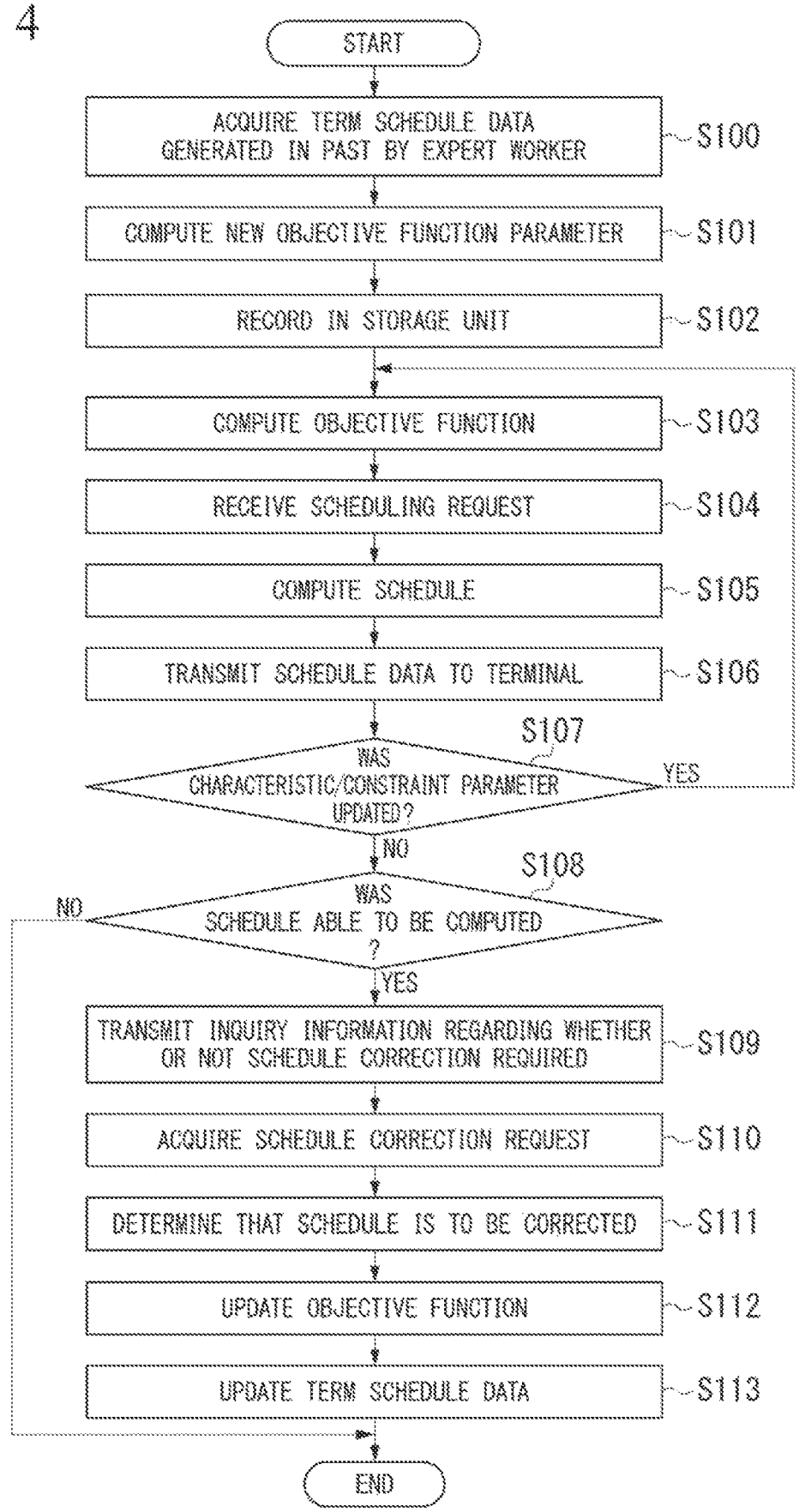
FIG. 4 is a first diagram illustrating the processing flow in a scheduling device according to the present embodiment.

FIG. 4 is a first diagram illustrating the processing flow in a scheduling device according to a first embodiment.

Next, the processing flow in the scheduling device 1 according to the first embodiment will be explained.

The database 104 in the scheduling device 1 stores schedule data generated in the past by a worker such as an expert worker. The objective function computation unit 12 acquires process starting instruction information. The process starting instruction information may be input by a worker using the terminal 2 and received by the reception unit 14 of the scheduling device 1 via a communication network. Alternatively, a worker may use an input device provided in the scheduling device 1 to directly input the process starting instruction information to the scheduling device 1.

Based on acquisition of the instruction information, the objective function computation unit 12 acquires, from the database 104, term schedule data Xe={x1, x2, x3, . . . , xM} that has been generated in the past by a worker such as an expert worker (step S100). The term schedule data Xe includes at least advertisement schedules x (x1, x2, x3, . . . , xM) for respective advertisement broadcasts. The objective function computation unit 12 may acquire, one by one and in order, the advertisement schedule x for each advertisement broadcast included in the term schedule data Xe generated in the past by the expert worker. The term schedule data Xe={x1, x2, x3, . . . , xM} generated in the past by a worker such as an expert worker includes the schedule of each advertisement broadcast assigned to a prescribed broadcasting contract term. The advertisement schedules x include information regarding the schedule of each individual advertisement broadcast and characteristic information regarding the advertisement broadcast. The term schedule data Xe may include television program information including the dates/times and characteristics of television programs in addition to the information regarding the advertisement schedules x.

In this case, it will be assumed that the term schedule data Xe that has been generated in the past by a worker such as an expert worker is a result obtained by solving the mathematical optimization below.

[Expression 1]

$$\max_{x \in \mathbb{R}^d} \theta^T \varphi(x), \qquad (1)$$
$$\text{s.t. } x \in X(p)$$

In Expression (1), θ is an objective function parameter that is specific to the worker such as an expert worker, and that is a special parameter determining the scheduling technique of the worker such as an expert worker. Additionally, in the objective function J(x)=θ$^T$φ(x), the objective function parameter θ refers to a weighting coefficient corresponding to each explanatory variable in the objective function J(x). As one example, the objective function parameter θ includes at least a relative importance level for each settable time that is predefined regarding the advertisement broadcast that is the scheduling target. In Expression (1), only the value of the objective function parameter θ is considered to be unknown.

Additionally, in Expression (1), x represents a decision variable vector R$^d$. Additionally, in Expression (1), X(p) represents an executable region, and X(p) represents a vector including one or more constraint parameters p that serve as constraint conditions. φ represents characteristic information and constraint conditions which are explanatory variables of the advertisement schedule x. The characteristic information includes, as one example, information such as the broadcast time (the day of the week of the broadcast, the broadcast starting time, and the broadcast ending time) of the advertisement broadcast. The characteristic information may further include information such as the age demographic and sex targeted by the advertisement broadcast, the advertisement content type, the types of television programs to be broadcast before and after the broadcast time of the advertisement broadcast. The constraint conditions include, as one example, information such as the time slots during which an advertisement must be broadcast, the types of television programs that are to be broadcast before or after the advertisement broadcast, and the number of broadcasts in a unit term. A unit term is a term such as one week or one month. The constraint parameters p are parameters relating to each of these constraint conditions. Expression (1) means that the worker such as an expert worker has prepared an advertisement broadcast schedule x in which the value of θ$^T$φ(x) corresponding to the objective function J(x) is maximized.

The objective function computation unit 12 uses the schedule data Xe={x1, x2, x3, . . . , xM} generated in the past by the worker such as an expert worker to estimate an objective function parameter θ of the worker such as an expert worker by means of inverse optimization. More specifically, the objective function computation unit 12 performs an inverse optimization based on the maximum-likelihood method.

[Expression 2]

$$\theta^* = \underset{\theta}{\operatorname{argmax}}\, p(X_e \mid \theta) \qquad (2)$$

An objective function parameter θ* that maximizes the likelihood p(Xe|θ), under conditions in which the term schedule data Xe generated in the past by the worker such as an expert worker is applied, is taken as the parameter of the worker such as an expert worker. More specifically, this objective function parameter θ* includes weighting coefficients for each of the explanatory variables (such as the characteristic information and the constraint conditions) such as the relative importance levels for settable times set in a unit term for performing a schedule. The settable times indicate, for example, the time periods, from the broadcast starting times to the broadcast ending times, assigned to each television program, and is preset within the time from 0 o'clock to 24 o'clock on each day within the unit term. The likelihood p (Xe|θ) is obtained, for example, by using the following Expression (3).

[Expression 3]

$$p(x_i \mid \theta) = \frac{\exp \theta^T \Phi(x_i)}{\sum_{k_j \in X} \exp \theta^T \Phi(x_i)} \qquad (3)$$

By taking the logarithm under the assumption that the term schedule data Xe={x₁, x₂, x₃, . . . , x_M} generated in the past by the worker such as an expert worker is generated from independent and identical distributions, Expression (2) can be converted to the following Expression (4).

[Expression 4]

$$\theta^* = \underset{\theta}{\operatorname{argmax}}\left(\sum_{i=1}^{M} \log p(x_i \mid \theta)\right) \qquad (4)$$

The objective function computation unit 12 uses the steepest ascent method to compute a new objective function parameter $\theta^{new}$ in which the objective function parameter θ* is updated (step S101). The objective function computation unit 12 records, in a storage unit such as the database 104, an ID of the advertisement broadcast that is the scheduling target, an ID indicating an explanatory variable, and the new objective function parameter $\theta^{new}$ computed for the explanatory variable, so as to be associated with each other (step S102).

[Expression 5]

$$\theta^{new} = \theta^{old} + \alpha \frac{\theta}{\partial \theta} \log p(x_i \mid \theta) \qquad (5)$$

The objective function computation unit 12 can determine a to be an arbitrary value in terms of step size. Additionally, in the case in which Expression (3) is employed as the expression representing the likelihood p, the objective function computation unit 12 updates the new objective function parameter $\theta^{new}$ as in the following Expression (6).

[Expression 6]

$$\theta^{new}=\theta^{old}+\alpha(\Phi(x_i)-\Phi(x)) \qquad (6)$$

In the above Expression (6), ϕ(x_i) is a characteristic quantity extracted from the advertisement schedule x of the advertisement broadcast being processed among the term schedule data Xe generated in the past by the worker such as an expert worker. Additionally, ϕ(x) is a characteristic quantity (weighting coefficient) of the advertisement schedule x generated under the past objective function parameter $\theta^{old}$. The objective function computation unit 12 may separately acquire, in order, the advertisement schedule x of each advertisement broadcast included in the term schedule data Xe generated in the past by the expert worker, and in this case, with each acquisition, the objective function parameter $\theta^{new}$ specific to the worker such as an expert worker is sequentially updated by the above-mentioned process. Furthermore, the objective function computation unit 12 computes the objective function J(x)=θ^Tϕ(x) including the objective function parameter $\theta^{new}$ for all advertisement broadcasts included in the term schedule data Xe generated in the past by the worker such as an expert worker (step S103).

In this state, a new worker uses the terminal 2 to schedule a new advertisement broadcast. At this time, due to operations by the worker, the terminal 2 communicably connects with the scheduling device 1. Additionally, due to operations by the worker, the terminal 2 outputs a scheduling request including commercial data regarding the advertisement broadcast to the scheduling device 1. The commercial data includes characteristic information and constraint conditions relating to the advertisement broadcast. As mentioned above, the characteristic information includes information such as the age demographic and sex targeted by the advertisement broadcast, the day of the week on which the advertisement is to be broadcast, the advertisement content type, and the types of television programs to be broadcast before and after the broadcast time of the advertisement broadcast. The constraint conditions may be time slots during which the advertisement must be broadcast, the types of television programs to be broadcast before or after the advertisement broadcast, or the like. Constraint conditions may be pre-stored in the scheduling device 1, and these constraint conditions may be used.

The reception unit 14 in the scheduling device 1 receives the scheduling request from the terminal 2 (step S104). The scheduling request includes commercial data and attributes (attributes relating to IDs or commercials, characteristic information, constraint conditions, etc.) relating to the commercial data. The scheduling unit 15 in the scheduling device 1 acquires the commercial data included in the received scheduling request. The scheduling unit 15 acquires characteristic information and constraint conditions for the advertisement broadcast from the commercial data. The scheduling unit 15 acquires the objective function J(x) computed by the objective function computation unit 12. The scheduling unit 15 inputs, to the objective function J(x), the characteristic information and the constraint conditions, and overall schedule data (schedule) including the term during which the advertisement broadcast is to be scheduled, advertisement broadcasts that are already set for that term, and the dates and times of the advertisement broadcasts (Expression (7)).

[Expression 7]

$$\max_{(\text{schedule})} J(\text{schedule}, \theta) \tag{7}$$

The scheduling unit 15, as a result thereof, computes the optimal schedule for the advertisement broadcast corresponding to the commercial data included in the scheduling request (step S105). The schedule includes at least information regarding the dates and times of the advertisement broadcast.

The reception unit 14 may, in the case in which the schedule cannot be computed, receive corrections to the constraint conditions or the characteristic information included in the commercial data for the commercial broadcast. Alternatively, the reception unit 14 may receive corrections to the objective function parameter θ. For example, the reception unit 14 transmits the computed schedule data to the terminal 2 (step S106).

The worker using the terminal 2 checks the schedule data computed for the advertisement broadcast, and determines whether the dates and times thereof represent times that are already filled by other advertisement broadcasts. Then, the worker updates a parameter (constraint parameter p) such as characteristic information or a constraint condition included in the commercial data, and makes another scheduling request. Then, the terminal 2 transmits, to the scheduling device 1, a scheduling request in which the constraint parameter p has been updated.

The scheduling device 1 receives the scheduling request. The reception unit 14 in the scheduling device 1 outputs the scheduling request to the scheduling unit 15. The scheduling unit 15 determines whether or not the constraint parameter p has been updated (step S107). For example, if the scheduling request includes a constraint parameter p, then the scheduling unit 15 determines that the constraint parameter p has been updated by the user. In the case in which the constraint parameter p has been updated, the scheduling device 1 repeats the process of computation of the objective function in step S103 described above.

The scheduling unit 15 may automatically determine whether the schedule data computed regarding the advertisement broadcast includes a time that has already been filled by another advertisement broadcast. In that case, the scheduling unit 15 updates the constraint parameter p such as the characteristic information or the constraint condition included in the commercial data by means of a defined update process, and repeats the schedule computation process. Furthermore, the scheduling unit 15 determines whether the advertisement broadcast request specified by the scheduling request was able to be computed (step S108). In cases such as the case in which the advertisement broadcast schedule cannot be computed even when the constraint parameter p is updated a prescribed number of times, the case in which there is not a time to which the advertisement broadcast can be assigned among the empty times in the schedule data overall, or the case in which a termination request has been received from the terminal 2 based on an operation by the worker, the scheduling unit 15 determines that a schedule cannot be computed, and the process ends.

Figure 5:
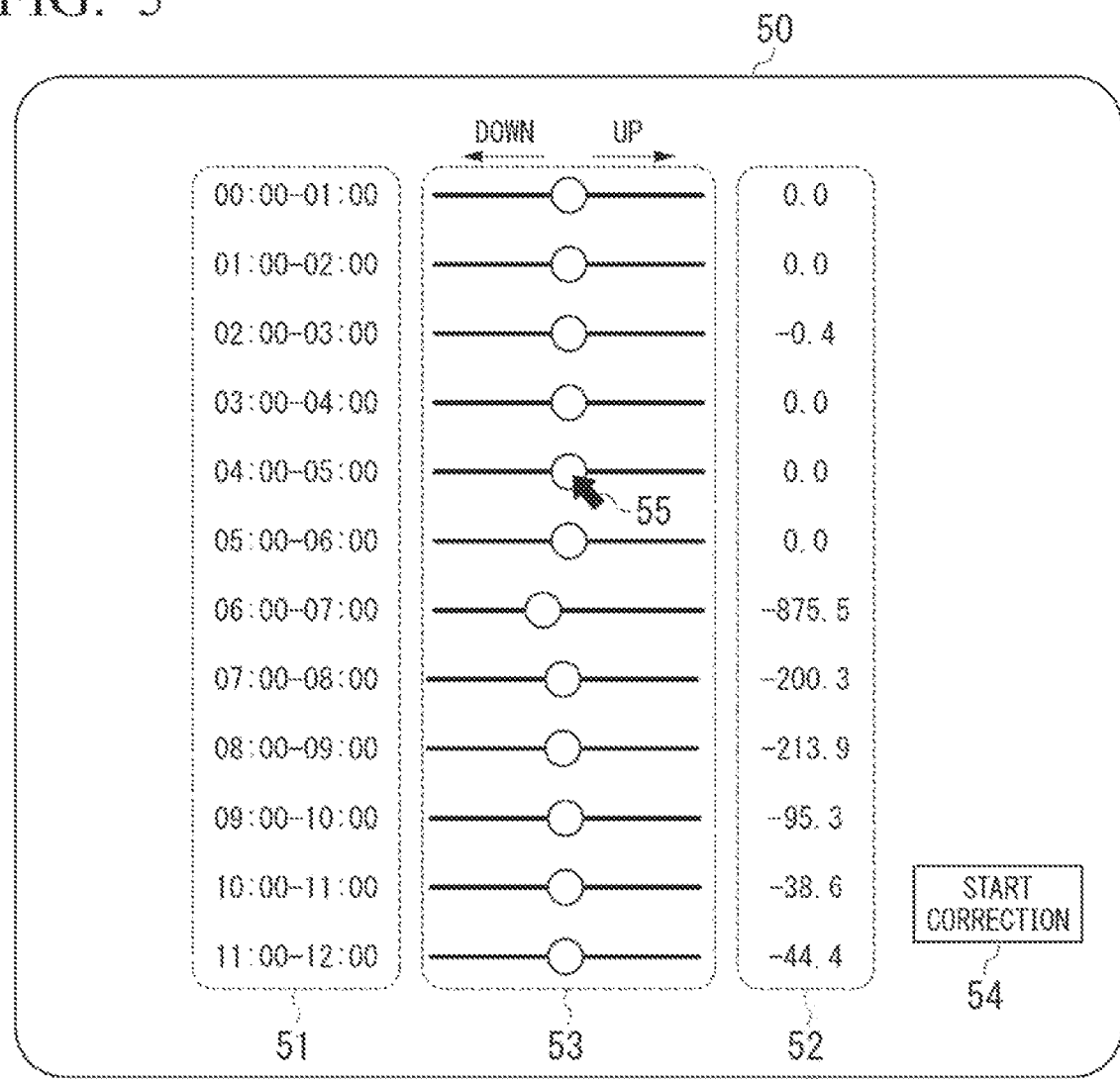
FIG. 5 is a diagram illustrating a schedule correction screen according to the present embodiment.

When it is determined that the advertisement broadcast schedule specified by the scheduling request has been calculated, the scheduling unit 15 determines whether or not to correct the schedule. For example, the scheduling unit 15 instructs the reception unit 14 to transmit, to the terminal 2, inquiry information regarding whether or not schedule correction is required. The reception unit 14 transmits, to the terminal 2, the inquiry information regarding whether or not schedule correction is required (step S109). The inquiry information may include data regarding the computed schedule or information for a schedule correction screen (FIG. 5).

The terminal 2 outputs the schedule data to a monitor or the like. The worker checks the schedule data content and determines whether or not to perform a correction. In the case in which the schedule is to be corrected, the worker inputs the correction information to the terminal 2. The worker making the correction is assumed to be a worker such as an expert worker. The correction information includes a date and time indicating a schedule that has not yet been decided or the like. Then, based on the operations by the worker, the terminal 2 transmits, to the scheduling device 1, a schedule correction request including the corrected schedule data or the like.

The reception unit 14 acquires the schedule correction request (step S110). The reception unit 14 outputs the corrected schedule data included in the schedule correction request to the scheduling unit 15. In the case in which corrected schedule data has been received, the scheduling unit 15 determines that the schedule is to be corrected (step S111). Then, the scheduling unit 15 starts updating the objective function J(x). As with the process in step S103, the scheduling unit 15 uses the corrected schedule data to compute the objective function J(x) including the parameters $\theta^{new}$, and updates the objective function (step S112).

Then, the scheduling unit 15 computes the optimal schedule for the advertisement broadcast corresponding to the commercial data that is the scheduling target based on the updated objective function J(x), and updates the overall term schedule data indicating the schedules for multiple advertisement broadcasts and television programs, including the schedule data that has been computed (step S113).

Due to the above processes, the scheduling device 1 computes an objective function J(x) to be used for generating schedule data for the scheduling target based on the characteristics of the scheduling target and schedule data that has already been decided regarding the scheduling target. At this time, the scheduling device 1 uses the inverse optimization technique based on decided schedule data that has been generated in the past to compute the objective function J(x) including a parameter specific to the scheduling method of a worker (such as an expert worker) who generated the decided schedule data. Furthermore, the scheduling device 1 generates schedule data for a scheduling target with an undecided schedule by using the characteristics of the scheduling target with the undecided schedule and the objective function J(x).

Due to such processes, the scheduling device 1 can provide a scheduling device for automatically generating schedule data similar to that of a worker (such as an expert worker) who generated the decided schedule data.

FIG. 5 is a diagram illustrating a schedule correction screen.

Figure 6:
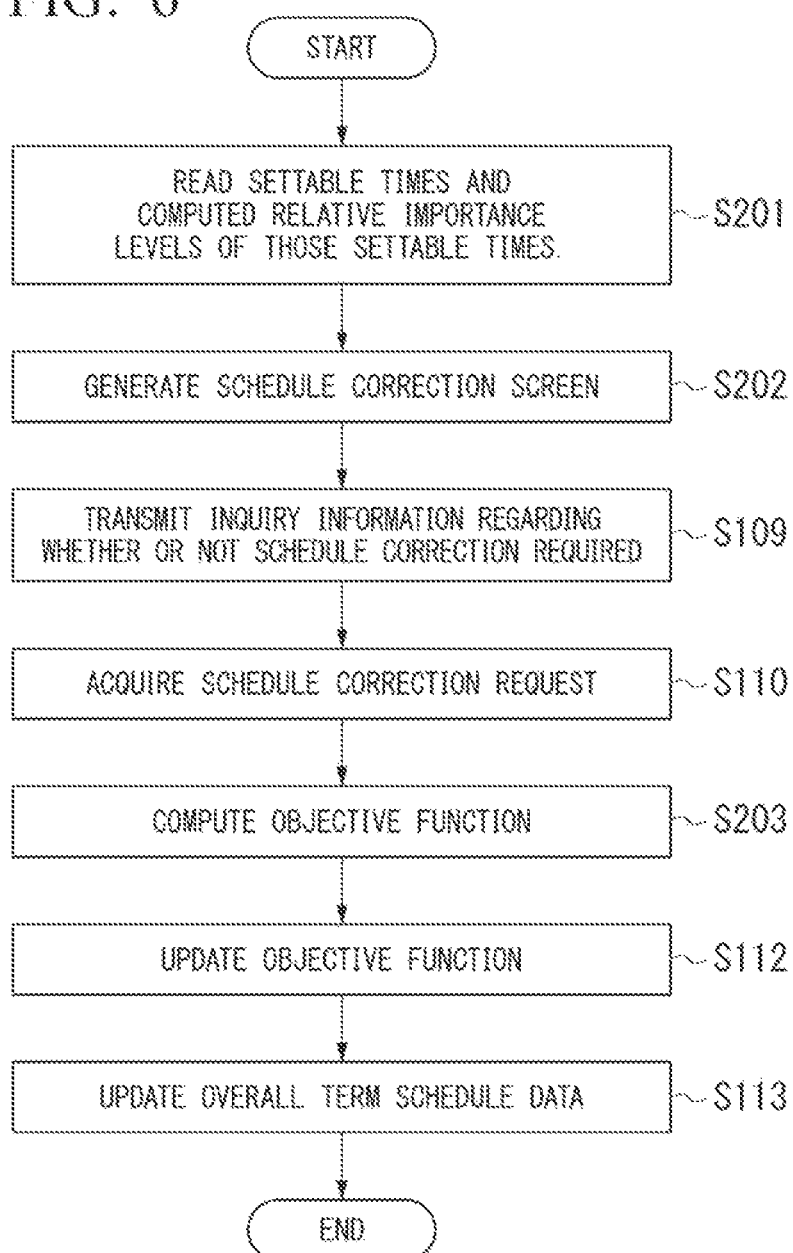
FIG. 6 is a second diagram illustrating the processing flow in the scheduling device according to the present embodiment.

FIG. 6 is a second diagram illustrating the processing flow in the scheduling device according to the first embodiment.

When transmitting the inquiry information regarding whether or not schedule correction is required in step S109 in the above process, the scheduling device 1 transmits, to the terminal 2, the data for the schedule correction screen 50 together with the inquiry information including whether or not schedule correction is required.

The schedule correction screen 50, as illustrated in FIG. 5, provides a first display area 51 for displaying multiple settable times, which are one of the constraint parameters for advertisement broadcasts. Additionally, the schedule correction screen 50 provides a second display area 52 for displaying the relative importance level (objective function parameter $\theta^{new}$) of each of the settable times for the advertisement broadcasts. The relative importance level is the relative importance against other settable times, and a lower value indicates greater importance, as a setting slot for advertisements, than another set time for which the value of the importance level is higher. Additionally, the schedule correction screen 50 is provided with a third display area 53 for displaying indicators for changing the relative importance levels. Additionally, the schedule correction screen 50 is provided with a button image 54 for the user to instruct the scheduling device 1 to start correction.

As a process before or after transmitting inquiry information regarding whether or not schedule correction is required in step S109 described above, the reception unit 14 reads the settable times stored in the database 104 in association with the ID of the advertisement broadcast that is the scheduling target, and the relative importance levels (objective function parameters $\theta^{new}$) computed for those settable times (step S201). The reception unit 14 generates a schedule correction screen 50 displaying the settable times that have been read, the relative importance levels computed for those settable times, and indicators for changing the relative importance levels (step S202). The reception unit 14 transmits, to the terminal 2, the inquiry information regarding whether or not schedule correction is required, including the schedule correction screen 50 (step S109).

The terminal 2 receives the inquiry information regarding whether or not schedule correction is required. The terminal 2 displays, on a display, the schedule correction screen 50 included in the information, and schedule data.

As mentioned above, the schedule data, in one example, indicates a television program schedule in which respective settable times are designated in a unit term, and the times for which advertisement broadcasts have been set in the television program schedule. A worker, who is the user, checks the schedule data, and in the case in which the worker wishes to change the value of the relative importance level with respect to any of the settable times to be applied to advertisement broadcast scheduling, the worker uses an input device such as a tenkey pad or a mouse to change the positions of the indicators in the third display area 53 on the schedule correction screen 50 by moving a cursor 55 by means of dragging operations.

In the present embodiment, when the user moves an indicator to the left, the relative importance level value for the settable time being manipulated goes down. Additionally, when the user moves an indicator to the right, the relative importance level value for the settable time being manipulated goes up. In FIG. 5, the settable times in which the relative importance level value is negative and the absolute value thereof is a high value indicate that the importance, as a set time in optimization of scheduling of the advertisement broadcast that is the scheduling target, is higher than the importance, as a schedule-set time, for other settable times.

In the case in which the position of the indicator is set at the center in the left-right direction, the value of the relative importance level becomes "0". A settable time in which the value of the relative importance level is "0" means that the importance as a schedule-set time of the advertisement broadcast that is the scheduling target is a medium value. The user can set the value of the relative importance level to be positive by moving the position of an indicator to the right.

Due to these settings, during schedule optimization, the scheduling device 1 computes an objective function J(x) in which the settable times that have been set to high relative importance levels have a higher probability of being assigned the advertisement that is the scheduling target, or in which the settable times that have been set to low relative importance levels have a lower probability of being assigned the advertisement that is the scheduling target.

The user manipulates a mouse or the like to press a button image 54 for starting correction. Then, the terminal 2 transmits a schedule correction request including at least IDs indicating settable times designated as those to be changed by changing the positions of indicators on the scheduling correction screen 50, the values of the relative importance levels changed by the user for those settable times, and the ID of the advertisement broadcast.

The reception unit 14 in the scheduling device 1 acquires the schedule correction request (step S110). The reception unit 14 outputs, to the scheduling unit 15, the advertisement broadcast ID, the IDs indicating the settable times, and the changed relative importance level values included in the schedule correction request. The scheduling unit 15 uses the IDs indicating the settable times and the values of the relative importance levels (parameters $\theta^{new}$) changed by the user for those settable times to compute the objective function J(x) (step S203), as in the process in step S103. The scheduling unit 15 stores, in the storage unit, the ID of the user, the ID of the advertisement broadcast, the objective function J(x), the IDs indicating the settable times, and the corrected relative importance level values in those settable times, so as to be associated with each other. As a result thereof, the scheduling device 1 updates the objective function J(x) (step S112).

Then, the scheduling unit 15 computes the optimal schedule for the advertisement broadcast corresponding to the commercial data that is the scheduling target based on the updated objective function J(x), and updates the overall term schedule data indicating the schedules for multiple advertisement broadcasts and television programs, including the schedule data that has been computed (step S113).

According to the above-mentioned process, the user can assign broadcasting times of advertisement broadcasts to more appropriate settable times simply by using the schedule correction screen automatically output by the scheduling device 1 to change the relative importance levels of settable times for the advertisement broadcast that is the scheduling target against other settable times.

Additionally, according to the above-mentioned process, the scheduling device 1 outputs, to the terminal 2, a scheduling correction screen clearly indicating that the objective parameters in the objective function J(x) are relative importance levels. Thus, the user can easily change the relative importance levels to attempt to assign broadcast times of the advertisement broadcast to settable times that are more appropriate.

Additionally, according to the above-mentioned process, the user can immediately check the results of scheduling performed by the scheduling device 1 to confirm whether the advertisement broadcast has been assigned to settable times that are appropriate.

The above-mentioned scheduling device 1 represents an example of a case in which advertisement broadcasts are scheduled into settable times. However, by processes similar to the above-mentioned processes, the scheduling device 1 may be applied to the case in which places to be visited by a user on business are to be scheduled into times in which visits are possible. In this case, the characteristics of the places to be visited may be addresses to be visited and distances to the places to be visited, and the constraint conditions may be the difficulty of work or time required for work at the places to be visited, or the like. Additionally, the objective function parameters may be the relative importance when assigning work to the times in which visits are possible. Additionally, the scheduling device 1 may compute the objective function or generate schedule data by the above-mentioned processes separately for each scheduling target.

Figure 7:
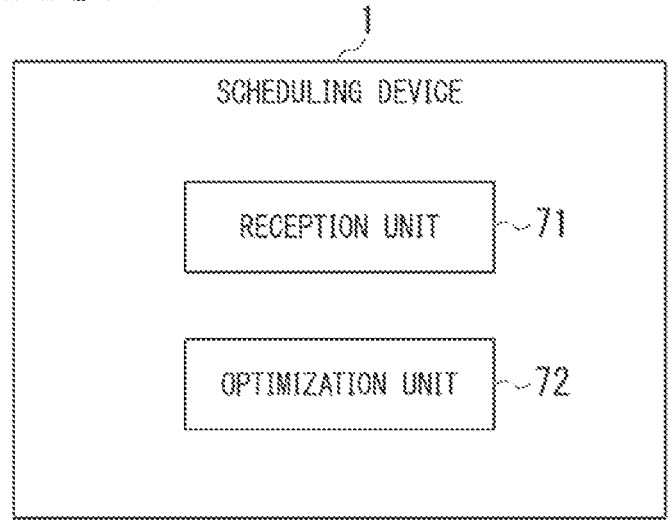
FIG. 7 is a diagram illustrating the minimum configuration of a scheduling device.

FIG. 7 is a diagram illustrating the minimum configuration of the scheduling device.

Figure 8:
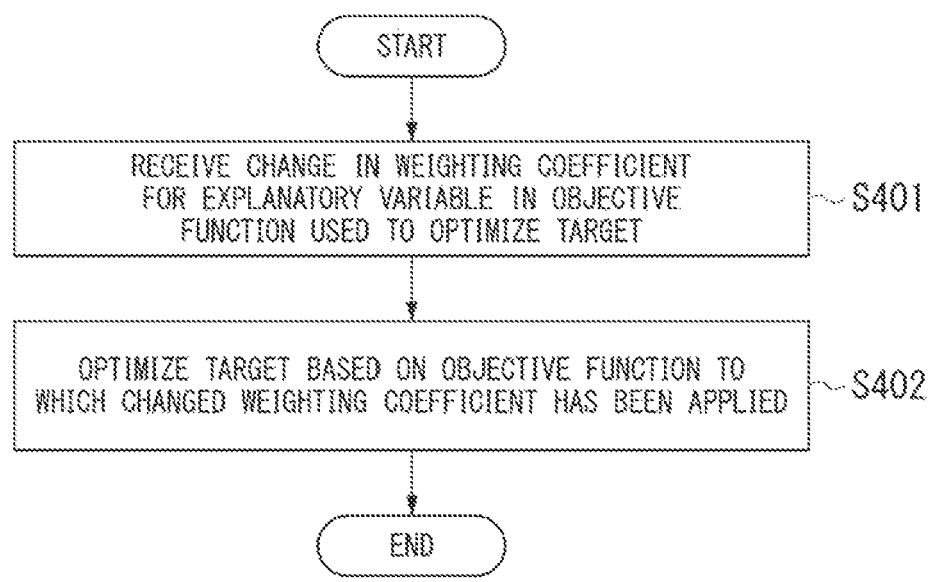
FIG. 8 is a diagram illustrating the processing flow in the scheduling device having the minimum configuration.

FIG. 8 is a diagram illustrating the processing flow in the scheduling device having the minimum configuration.

As illustrated in FIG. 7, the scheduling device provides the functions of at last the reception unit 71 and the optimization unit 72.

The reception unit 71 receives a change in a weighting coefficient for an explanatory variable in an objective function used to optimize a target (step S401).

The optimization unit 72 optimizes the target based on the objective function J(x) to which the changed weighting coefficient has been applied (step S402).

In the embodiment described above, the optimization target is an advertisement broadcast, and the case in which the scheduling of advertisement broadcasts is optimized is described. However, the scheduling device 1 may be a device for optimizing another optimization target.

For example, the optimization target may be the steering wheel of a car, and the optimization may control the angle of the steering wheel of the car from a prescribed position. In this case, the objective function may be for scheduling the angle of the steering wheel at each of moments in time up to a few minutes in the future. Furthermore, in this case, the reception unit 71 receives a change to a weighting coefficient for an explanatory variable in an objective function used to optimize the scheduling of the angle of the steering wheel that is the optimization target in accordance with the moments in time. The optimization unit 72 acquires the objective function J(x), which has been computed by using driving history information (optimized results) such as the angles of the steering wheel steered by an expert driver in accordance with the respective moments in time, constraint parameters for the explanatory variable, the changed weighting coefficient for the explanatory variable, and an inverse optimization technique. The optimization unit 72 generates schedule data indicating the angles of the steering wheel at the respective moments in time up to a few minutes in the future based on the objective function J(x).

Additionally, the optimization target may be the accelerator of a car, and the optimization may control the degree of depression of the accelerator of the car. In this case, the objective function may be for scheduling the degree of depression of the accelerator at moments in time up to a few minutes in the future. Furthermore, in this case, the reception unit 71 receives a change to a weighting coefficient for an explanatory variable in an objective function used to optimize the scheduling of the degree of depression (amount of depression) of the accelerator that is the optimization target. The optimization unit 72 receives the change to the weighting coefficient, with respect to the explanatory variable in the objective function that is used for scheduling the degree of depression of the accelerator by the expert driver, in accordance with the respective moments in time, for the moments in time up to a few minutes in the future. The optimization unit 72 acquires the objective function J(x), which has been computed by using driving history information (optimized results) such as the degrees of depression of the accelerator by an expert driver in accordance with the respective moments in time, constraint parameters for the explanatory variable, the changed weighting coefficient for the explanatory variable, and an inverse optimization technique. The optimization unit 72 generates schedule data indicating the degrees of depression of the accelerator at respective moments in time up to a few minutes in the future based on the objective function J(x).

Additionally, the optimization target may be a product, and the optimization process may compute the amount of the product to be ordered. In this case, the objective function may be for scheduling the amount of the product to be ordered on each day in the future. Furthermore, in this case, the reception unit 71 receives changes to the weighting coefficient for an explanatory variable in an objective function used to optimize the amount of the product to be ordered, which is the optimization target. The optimization unit 72 acquires the objective function J(x), which has been computed by using ordered amounts (optimized results) for similar days in the past indicated by the results of orders by an expert, constraint parameters for the explanatory variable, the changed weighting coefficient for the explanatory variable, and an inverse optimization technique. The optimization unit 72 generates schedule data indicating the amounts of the product to be ordered on each day in the future based on the objective function J(x).

The above-mentioned scheduling device 1 may have a computer system that is internal thereto. Furthermore, the steps in the above-mentioned processes are stored in the form of a program in a computer-readable storage medium, and the above-described process is performed by a computer reading out and executing this program. In this case, a computer-readable recording medium refers to a magnetic disk, a magneto-optic disk, a CD-ROM, a DVD-ROM, a semiconductor memory, or the like. Additionally, this computer program may be transmitted to the computer by means of communication lines, and the computer that has received this transmission may execute the program.

The above-described program may be for realizing just some of the aforementioned functions. Furthermore, it may be a so-called difference file (difference program) in which the aforementioned functions can be realized by being combined with a program that is already recorded on the computer system.

REFERENCE SIGNS LIST

1 Scheduling device (optimization device)
2 Terminal
11 Control unit
12 Objective function computation unit (objective function computation means)
14 Reception unit (reception means)
15 Scheduling unit (optimization means)
100 Scheduling system

What is claimed is:

1. An optimization device comprising:
at least one memory configured to store instructions; and
at least one processor configured to execute the instructions to:

compute an objective function used to optimize a target, which includes, as a parameter, a weighting coefficient for an explanatory variable, based on optimized results generated in the past and the explanatory variable, using an inverse optimization technique;

transmit, to a terminal device, an inquiry information regarding whether or not a schedule correction is required;

receive a change in the weighting coefficient for the explanatory variable, in response to receiving a request for the schedule correction from the terminal device; and optimize the target based on the objective function to which the changed weighting coefficient has been applied.

2. The optimization device according to claim 1, wherein the at least one processor is further configured to execute the instructions to:

compute the objective function based on the optimized results by an expert who has performed the optimization in the past, a constraint parameter relating to the explanatory variable, and the changed weighting coefficient for the explanatory variable.

3. The optimization device according to claim 1, wherein the at least one processor is configured to execute the instructions to:

receive the change in the weighting coefficient for the explanatory variable in the objective function used to optimize scheduling of a scheduling target, which is the target; and generate, in the optimizing, schedule data optimizing the scheduling of the scheduling target based on the objective function to which the changed weighting coefficient has been applied.

4. The optimization device according to claim 3, wherein, the scheduling target is an advertisement, the schedule data is a schedule for broadcasting the advertisement, and the at least one processor is configured to execute the instructions to generate the schedule data for broadcasting the advertisement.

5. An optimization method comprising:

computing an objective function used to optimize a target, which includes, as a parameter, a weighting coefficient for an explanatory variable, based on optimized results generated in the past and the explanatory variable, using an inverse optimization technique;

transmitting, to a terminal device, an inquiry information regarding whether or not a schedule correction is required;

receiving a change in the weighting coefficient for the explanatory variable, in response to receiving a request for the schedule correction from the terminal device; and optimizing the target based on the objective function to which the changed weighting coefficient has been applied.

6. A non-transitory computer-readable recording medium recording a program that causes a computer to perform processes, the processes comprising:

computing an objective function used to optimize a target, which includes, as a parameter, a weighting coefficient for an explanatory variable, based on optimized results generated in the past and the explanatory variable, using an inverse optimization technique;

transmitting, to a terminal device, an inquiry information regarding whether or not a schedule correction is required;

receiving a change in the weighting coefficient for the explanatory variable, in response to receiving a request for the schedule correction from the terminal device; and optimizing the target based on the objective function to which the changed weighting coefficient has been applied.

7. The optimization device according to claim 1, wherein the at least one processor is configured to execute the instructions to compute the objective function using the inverse optimization technique based on a likelihood.

8. The optimization device according to claim 1, wherein the objective function is used to optimize scheduling of a scheduling target, which is the target, and the weighting coefficient indicates a probability of being assigned the scheduling target for each schedule period, relative to the other periods.

* * * * *